219-121. 9-11-73 OR 3,758,745

United States Patent [19]

Wilker et al.

[11] 3,758,745

[45] Sept. 11, 1973

[54] SUBSTRATE POSITIONED DETERMINATION STRUCTURE AND METHOD

[75] Inventors: Paul S. Wilker; William B. Kiss; Graham A. Neathway, all of Ottawa, Ontario, Canada

[73] Assignee: Microsystems International Limited, Montreal, Quebec, Canada

[22] Filed: Sept. 7, 1971

[21] Appl. No.: 177,997

[52] U.S. Cl. ......... 219/121 LM, 29/620, 219/125 R, 318/572

[51] Int. Cl. ......... B23k 27/00

[58] Field of Search ......... 219/121 L, 121 EB, 219/125; 318/572; 250/49.5; 83/63, 522

[56] References Cited

UNITED STATES PATENTS

| | | | |
|---|---|---|---|
| 3,388,461 | 6/1968 | Lins | 219/121 L |
| 3,535,778 | 10/1970 | Falanga et al. | 219/121 LM |
| 3,476,906 | 11/1969 | Rovan | 219/121 EB |
| 3,644,700 | 2/1972 | Kruppa et al. | 219/121 EB |
| 3,584,183 | 6/1971 | Chiaretta | 219/121 LM |
| 3,513,285 | 5/1970 | Imura | 219/121 EM |
| 3,519,788 | 7/1970 | Hatzakis | 219/121 EM |

*Primary Examiner*—R. F. Staubly
*Assistant Examiner*—George A. Montanye
*Attorney*—Edward E. Pascal

[57] ABSTRACT

A resistive strip adherently deposited on a substrate is progressively cut by a laser beam while the resistance of the strip is monitored. As the last edge becomes cut, the resistance approaches infinity, and the relative position of the laser beam with respect to the substrate is registered, providing a high resolution coordinate on the substrate which is useable as a base from which further laser trimming of circuitry deposited on the substrate may be performed.

9 Claims, 7 Drawing Figures

SUBSTRATE POSITIONED DETERMINATION STRUCTURE AND METHOD

This invention relates to an apparatus and a technique for accurately aligning a laser cutting beam with a substrate in order that thin or thick film electronic circuits may be trimmed with accuracy.

While laser trimming of thin and thick film circuits is widely known, there has been considerable difficulty in accurately positioning the laser beam with respect to the circuits to be trimmed. Commonly, the laser beam is aligned to a pair of crosshairs central to an optical path, and the pair of crosshairs is further aligned with a predetermined position on each of the thin or thick film substrates. In order to use this technique during manufacture of mass quantities of such circuits, the crosshairs are aligned with the laser beam at the beginning of a manufacturing period, and the crosshairs are aligned repetitively with predetermined positions on successive substrates prior to each being trimmed.

It may be seen that since there is normally some unavoidable vibration in the entire apparatus as the manufacturing process continues, reflecting mirrors, the laser apparatus, and any additional optical apparatus used often move out of alignment. The outcome is the production of reject trimmed circuits, since trimming is performed at often undesirable portions of the circuits. It is obviously undesirable to completely align the entire apparatus after each circuit is trimmed, since this greatly increases the manufacturing cost thereof due to the excess time and labour involved. However this complete alignment procedure has become necessary in many instances in order to obtain a satisfactory product yield.

Accuracy of the above-described optical method generally is found to be about ± several thousandths of an inch, due to the misalignment problem.

We have invented a laser alignment apparatus and method which has an alignment acuracy of about ± one half mil, or about one half the laser beam diameter at the film circuit surface. Manual or automatic alignment need only be made to a general area on the substrate surface, after which the apparatus takes over and registers precise co-ordinate positions which serve as base-points and lines from which further trimming of the circuit may be performed.

Accordingly, the problem of misalignment is nearly eliminated, and a substantially increased yield, at low cost, is obtained.

The aforementioned advantages are obtained by the provision of a substrate; a resistive strip fixed to the surface of the substrate; cutting means such as a laser beam adjacent the substrate for progressively cutting the resistive strip from one of its edges to the other, thereby increasing its resistance towards infinity; means for moving the cutting means or the substrate relative to the other along a predetermined line, so as to effect the progression of the cut; means for measuring the resistance of the resistive strip transversely to the direction of movement; and means connected to the measuring means for reacting to the resistance of the resistive strip as it becomes infinite to accurately register the relative position of the cutting means, and hence the edge of the resistive strip on the substrate. Accordingly, the last cut edge of the resistive strip is registered as a point on the plane formed by the edge of the resistive strip: a base coordinate for further trimming.

While in this specification the resistive strip, and the circuit to be trimmed will be described as a thin film circuit, it will be recognized that the invention is equally applicable to other types of circuits such as thick film glass frit circuits, silk screened circuits and the like. Furthermore, while the apparatus for cutting or trimming the thin film circuit is described with reference to a laser trimming means, it is intended that apparatus for providing spark erosion of the thin film material, and other high resolution cutting means is equally suitable in this invention.

A more detailed description of the invention is given in the description which follows, with reference to the following figures.

Figures 1, 2, 3, 4, 5:
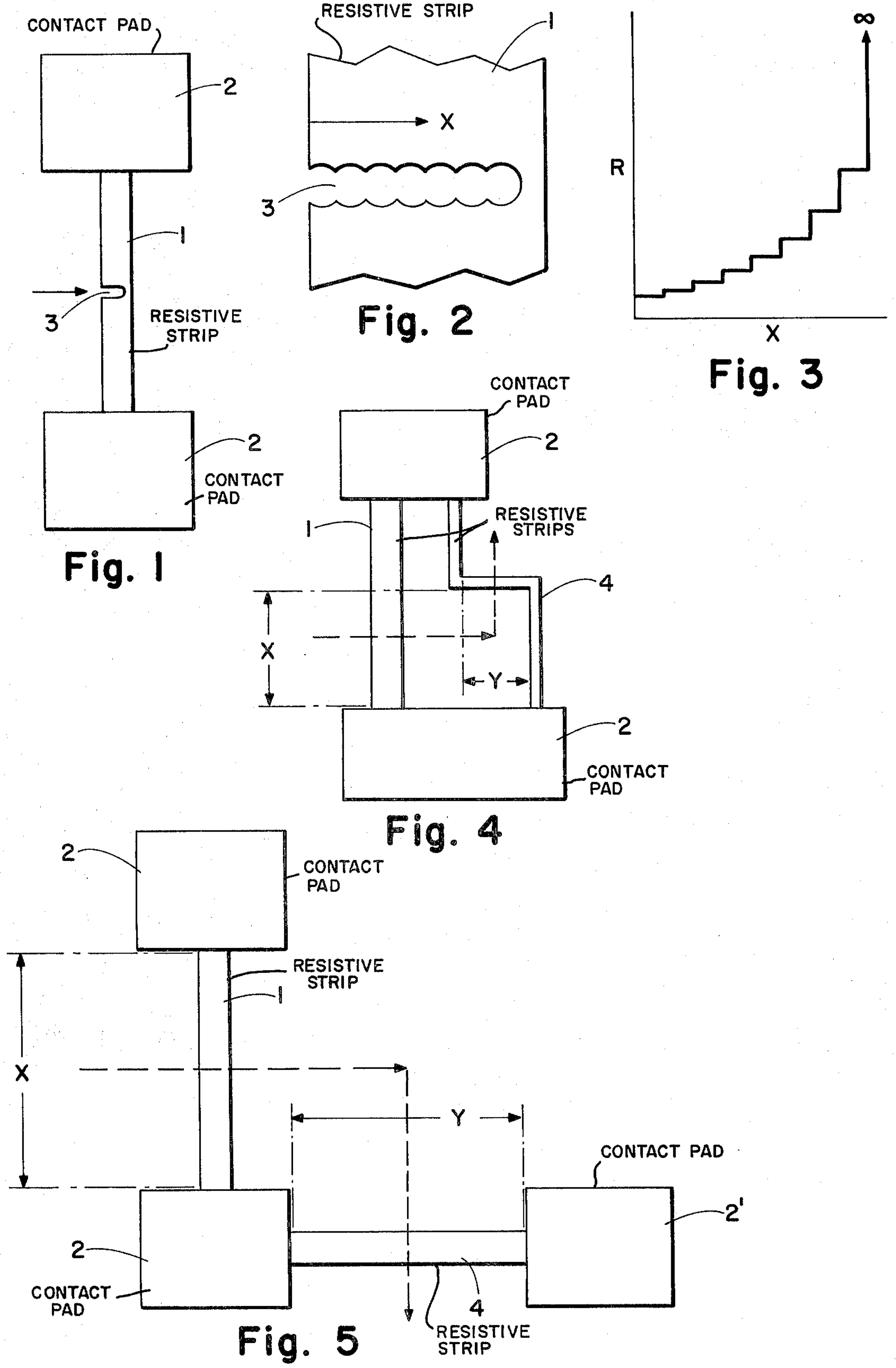
FIG. 1 shows in plan view a partially cut resistive strip on the surface of the substrate.
FIG. 2 is a close-up of a partially cut resistive strip in plan view.
FIG. 3 is a graph of the resistance measured along the resistive strip as it is progressively cut thereacross.
FIG. 4 shows in plan view a pair of resistive strips on the surface of a substrate which allows registration of two co-ordinates.
FIG. 5 shows in plan view a pair of resistive strips in a variation of FIG. 2.

FIG. 1 is a plan view of a resistive strip 1 used in the invention. The resistive strip 1 is adherently disposed on the surface of a substrate, not shown. At the two ends of the resistive strip are a pair of contact pads 2 ohmically contacting the resistive strip 1. The resistive strip can extend past one or both contact pads to a further circuit disposed on the surface of the substrate, or to an additional resistive strip such as will be described later.

A means for cutting the resistive strip is disposed adjacent and above the substrate. Means for moving either the cutting means or the substrate causes relative movement of the cutting means transverse to one edge of the resistive strip 1, cutting the resistive strip progressively toward its other edge, thereby increasing its resistance toward infinity The arrow in FIG. 1 shows the direction of movement of the cutting means relatively across the resistive strip. The slot 3 depicts where the resistive strip has been cut, nearly all the way through, by which point its resistance has been increased substantially from its uncut value.

In the thin film application of this invention, it is preferred that the resistive strip 1 be made of sputttered tantalum in the range of approximately 500 angstroms to 10,000 angstroms in thickness although this range of thickness need not be strictly adhered to. The thickness of the tantalum used preferentially is determined by the thickness required in the remainder of the circuit on the surface of the substrate, since only one sputtering cycle for all such resistances are desirable. The thickness will also be determined by the ability of the cutting means to cut through it. A thicker resistive strip requires a more intense laser beam.

The substrate may be any common thin film substrate, for example, fabricated of beryllia or alumina. A useful laser cutting system is described in the reference "Operation of the Continuously Pumped, Repetitively Q Switched, YALG ND Laser", by R.G. Smith and M.F. Galvin, IEEE Journal of Quantum Electronics, Vol QE–3, No. 10, October 1967.

Another suitable high resolution cutting means is an apparatus which provides thin film erosion under influence of a spark discharge, and is described in the reference "High Precision Spark Machining", by C. Van Osenbrugger, Philips Technical Review, Vol. 6–7, pages 195 to 208.

The dimensions of the resistive strip 1 in the described embodiment of FIG. 1 are approximately twenty thousandths of an inch ± ten thousandths of an inch in length, and about 3 mils in width, and it should have a resistance between the contact pads 2 of about 500 ohms.

Turning now to FIG. 2, a plan view of a portion of the resistive strip 1 surrounding the slot 3 is shown greatly enlarged. Since the laser beam is pulsed, it has been found that the slot in the resistive strip is evaporated as a series of small bites, which are evident in FIG. 2.

In the example shown, the slot has been cut almost all the way through the width of the resistive strip, leaving one bite to be evaporated.

Turning now to FIG. 3, a graph of the resistance R of the resistive strip measured between the contact pads 2 is shown, with distance X from the edge at which the cutting (evaporation) of the slot began. It may be seen that the resistance increases in a series of small steps, each step of resistance corresponding to the resistance remaining after each successive bite is evaporated. Prior to the evaporation of the last neck or bite of resistive strip, there remains a finite, but greatly increased resistance between the contact pads. When the last neck is cut, the resistance suddenly increases to infinity. It is the sensing of the sudden increase to infinity which allows registration of the position of the last neck of resistive strip material, which, within a tolerance is a very accurate representation of the position of the last-cut edge of the resistive strip. This forms one coordinate point on the surface of the substrate.

Since the laser beam spot size is of the order of 1 mil in diameter, the accuracy of the registration is approximately ± ½ mil. It obviously does not depend on the optics of the laser beam, nor any crosshair alignment technique.

The contact pads 2 are connected to a well known bridge circuit, which has its output connected to an over-voltage detector, the combination forming a resistance over-value detector. Detection of an over-value in resistance, such as for instance, 50,000 ohms, provides a logical output which can be registered as a relative position of the laser beam or substrate driving motors, or may be used to stop a position counter which has been operating as the laser beam or substrate position driving motors have been functioning. This apparatus, however, is well known and thus forms part of the prior art and will not be described in detail in this specification. References describing such mechanisms will be noted later in this specification.

FIG. 4 shows a plan view of a pair of resistive strips with which two co-ordinates on two lines may be accurately determined.

Resistive strip 1 is connected between contact pads 2 in a similar manner to that described with reference to FIG. 1. A second resistive strip 4, having a step in its layout in a direction transverse to the first resistive step, is also connected between the same contact pads. The stepped portion is the part of the strip to be cut and thus on which a point on the line of the edge of the stepped portion which co-ordinate is accurately determined.

The resistance of the second resistive strip 4 should be greater than the aforementioned over-value of resistance to be detected in resistive strip 1. In practice, it has been found that if the first resistive strip is about 500 ohms, the second resistive strip 4 should be at least approximately 2,000 ohms, and preferably 5,000 ohms or greater in order that an over-value of resistance of, for example, 4,000 ohms of resistive strip 1 can be detected. However, in some applications the resistance of resistive strip 4 should be made as low as twice the resistance of resistive strip 1.

In operation, the laser beam cutting means is positioned somewhere to the left of the resistance strip 1 within the boundaries of the distance X, which indicates the distance between one contact pad 2 and the near edge of the stepped portion of the second resistive strip 4. The laser beam follows the dashed arrow, progressively cutting thrugh the resistive strip 1, as the resistance measured between the contact pads 2 rises toward infinity. The increase in resistance may be detected by an over-value detector sensing a resistance rise above, for instance, 4,000 ohms, which is about an eight times increase in resistance of the resistive strip 1.

The laser beam then may be automatically shut off, if desired, and is moved along the same line to somewhere within the region of width Y under the stepped portion of the second resistive strip 4.

The laser beam is then switched on (if it has been previously shut off), and is moved transversely to the stepped portion of the second resistive strip 4, cutting it in a similar manner to that described with reference to resistive strip 1. As it cuts through to the opposite edge of the strip, the resistance measured between contact pads 2 rises from 5,000 ohms to a value considerably higher towards infinity. At a predetermined over-value level, for instance at 50,000 ohms, which will be sensed at the last-to-be cut portion of the second resistive strip, an over-value detector causes registration of the co-ordinate of the last-cut portion on a line along the last-cut edge thereof. The laser beam and relative movement thereof may also now be caused automatically to shut off and stop.

From the two registered co-ordinate positions thus derived, each on a line orthogonal to the other, a pair of base lines and an origin may be derived from which further laser trimming of other circuitry on the surface of the substrate may be performed, since the other circuitry is laid down in known dimensional relationship to the resistive strips.

FIG. 5 shows in plan view an alternative layout of first and second resistive strips 1 and 4. The first resistive strip 1 is deposited on the surface of a substrate between contact pads 2 in a similar manner to that described with reference to FIG. 1. In this embodiment, however, second resistive strip 4 is laid out orthogonally to the first resistive strip 1 leading from one or the other of the contact pads 2, and is ohmically contacted at its other end by contact pad 2'.

In operation, the laser cutting beam is roughly aligned to the left of the resistive strip 1 within the boundaries of the distance X. It is then moved across resistive strip 1, cutting it as described earlier, along the dashed line arrow. Once it has travelled to within the region having width Y it begins movement transversely to the second resistive strip 4, cutting it as described earlier. Points on the last-cut edges of first resistive strip 1 and second resistive strip 4 mark the co-ordinates to be registered, which defines the base from which further trimming will be executed.

Figure 6:
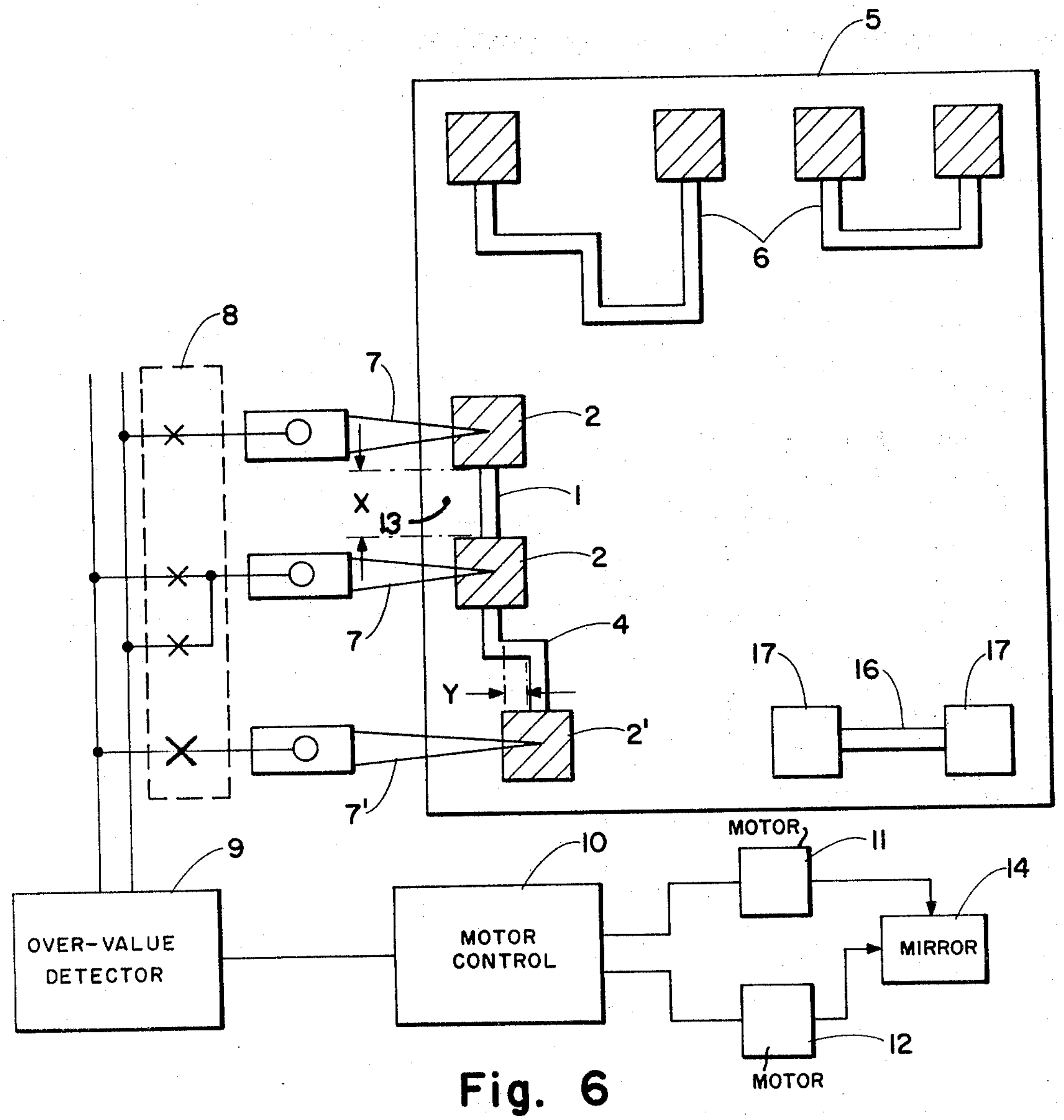
FIG. 6 shows in plan view a substrate having on its surface a further arrangement of resistive strips, and also shows the position determining apparatus system in block diagram FIG. 6A showing the laser beam path to the substrate surface.

Turning now to FIG. 6, a substrate 5 is shown having a number of elements 6 adherent to a surface, constituting a circuit to be trimmed. At the lower left hand corner of the substrate resistive strip 1 is adherently deposited, ohmically contacted at its ends by contact pads 2. Second resistive strip 4 is adherently deposited between a contact pad 2 and a further contact pad 2'. The circuit elements 6 are deposited known dimensional distances from the resistive strips 1 and 4.

A further arrangement of resistive strips 1 and 4 are shown, by way of example, in this figure. The second resistive strip contains a step which centrally intersects a line along the last-to-be-cut edge of resistive strip 1. Contact probes 7 temporarily ohmically contact, contact pads 2 by pressure. Later, when another circuit is to be trimmed the probe pressure will be removed and the substrate 5 can be replaced by a second substrate.

Connected to the contact probes 7 by way of a switching matrix 8 is a resistance over-value detector 9 described earlier.

The output of the resistance over-value detector 9 is connected to X co-ordinate counter and register, orthogonal direction Y co-ordinate counter and register, and motor control circuit 10. Connected to the output of control circuit 10 are the X direction motor drive 11 and Y direction motor drive 12, which control horizontal movement of either a table on which the substrate is positioned, or the laser beam.

Laser beam drive and control mechanisms and circuits are well known, and are described, for instance, in U.S. Pat. No. 3,551,057 to R.A. Hamilton et al and U.S. Pat. No. 3,448,280 to H. Blitchington Jr. et al, and hence will not be described in detail, since they form part of the prior art. However, suffice to say that it is preferred that the laser beam is driven rather than the substrate table since their appears to be considerably more vibration introduced into the apparatus when the table is driven, rather than when the laser beam is driven.

Figure 6A:
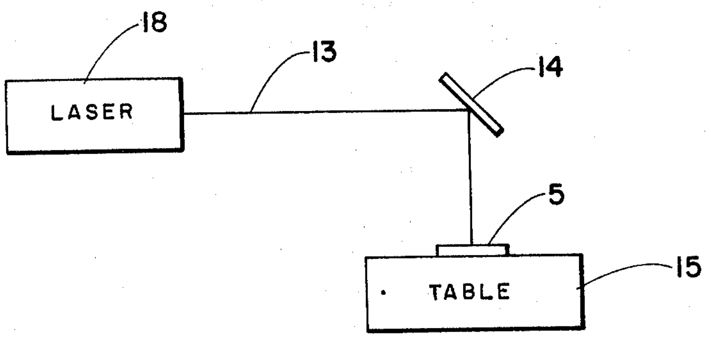

Turning for a moment to FIG. 6A, a schematic side elevation view of parts of the laser cutting apparatus is shown. A laser 18 provides an extremely narrow and intense beam of light 13, which is reflected toward the substrate 5 by means of mirror 14. The substrate 5 is immovably held to a substrate table 15. Well known driving means (not shown), operated by motors 11 and 12, move the mirror 14 backward and forward, and tilt it from side to side causing the laser light beam 13 to follow a desired path on the surface of the substrate. Since the light is highly intense, thin film circuitry on the surface of the substrate will be evaporated and thus will be effectively cut where the light beam touches the thin film circuitry. The remainder of the substrate is substantially unaffected.

Returning to FIG. 6, the light beam 13 is first positioned to the left of the resistive strip 1 within the region having width X. The beam is caused to move across resistive strip 1, cutting it so that the resistance, measured by the over-value detector 9 through the switching matrix 8, the probes 7, the contact pads 2 and the resistive strip 1, increases in steps as the laser 12 is pulsed. The position of the laser beam at which the resistance increases quickly toward infinity is registered by the over-value detector. This may be performed simply by registration on a high resolution mirror movement motor rotation counter of the position which the mirror has caused the light beam 13 to move to, by means of the motor control circuit.

At this position, the movement of the laser beam is stopped in one direction, and is caused to move toward the step in the second resistive strip 4.

At this point, the switching matrix 8 disconnects contact probes 7 from the resistance over-value detector in a well-known manner, connecting in its place a contact probe 7' with a mate contact probe 7 across contact pads 2 and 2' at the ends of second resistive strip 4.

By sensing the position of the last-cut portion of resistive strip 1, then immediately moving the laser light beam 13 downward across resistive strip 4, there is automatic alignment of the laser beam within the region of having width Y which is necessary for cutting the second resistive strip 4.

The light beam of the laser is caused to move, by rotation of the mirror 14, through middle contact pad 2 across the step of second resistive strip 4. During this interval, movement in that direction is recorded in control circuit 10, in the transverse co-ordinate counter and register, which is an identical circuit to that described with reference to movement of the light beam in cutting resistive strip 1. Resistive strip 4 is thus evaporated and cut in a similar manner to that of resistive strip 1.

Thus by registering the positions of the last-cut portions of resistive strips 1 and 4, the accurate coordinates of two points on two known lines on the substrate are determined providing a base axis. Since all other circuit elements 6 on the substrate are known distances from the resistive strips, no further laser alignment is necessary, except by reference to the base just determined, in order to perform accurate trimming.

In the lower right hand corner of substrate 5 a third resistive strip 16 is shown, having one edge orthogonal to resistive strip 1. In a similar manner a resistive strip 1, contact pads 17 ohmically contact its ends.

Instead of, or in addition to, resistive strip 4, the resistance of the third resistive strip 16 may be monitored while the substrate 5 or reciprocally the laser light beam 13 is rotated with respect to a point at the lower left hand corner of the substrate. If second resistive strip 4 is used or, the axis of rotation desirably is the origin formed by the two co-ordinates determined by use of resistive strips 1 and 4. If resistive strip 4 is deleted, then the axis of rotation should be at a point at which two lines running along the mutually orthogonal edges of resistive strips 1 and 16 intersect.

By use of the third resistive strip 16, rotational misalignment in the plane of the table 15 may be virtually completely eliminated during further trimming of the circuit elements 6, although this alignment is only important in certain circumstances.

It will become obvious to one skilled in the art that the invention just described need not be limited to thin film circuits, but may be applied to any type of circuit structurally interrelated which allows cutting of a pair of elements on its surface by a high resolution cutting means.

While the preferred thin film sputtered tantalum applicant used has resistivity of the order of 100 to 150 ohms per square, it is obvious that laser cutting of thick film circuits allows resistivities between about 10 ohms to 1 megohm per square to be used, although the lower value total resistances are much preferred in order that better tolerances would be achieved, since high value resistances may be considered by over-value detectors as being considerably closer to infinity than lower total resistances. To suit individual needs of course the widths of the resistive strips may be modified, as may be the laser light beam width, resistive strip layouts, etc.

The above-described arrangements should be therefore understood as being illustrative of the application of the principles of the invention. Numerous other arrangements may be devised by those skilled in the art without departing from the spirit and scope of the invention.

What is claimed is:

1. A substrate position determining apparatus comprising:

a. means for restraining a substrate having a first resistive strip and another element fixed to its surface, the first resistive strip being located in a predetermined position with respect to the other element, b. means adjacent the substrate position for progressively cutting the first resistive strip from one of its edges toward the other, thereby increasing its resistance, c. means for causing relative movement between the (b) means and substrate along a predetermined line so as to effect the progression of the cut, d. means for measuring the resistance of the first resistive strip transversely to the direction of movement, and e. means connected to the (d) means for reacting to the increase in measured resistance above a predetermined value to accurately register the relative position of the (b) means relative to a point on the first resistive strip. on the substrate.

2. An apparatus as defined in claim 1, in which the (b) means is comprised of a laser beam adapted to cut a path through the resistive material of the first resistive strip as the substrate and (b) means are relatively moved.

3. An apparatus as defined in claim 2, wherein the first resistive strip is comprised of a thin film of sputtered tantalum adherent to the surface of the substrate, and a pair of contact pads for measuring the resistance of the resistive strip, ohmically contacting the resistive strip on opposite sides of the path of the laser beam.

4. An apparatus as defined in claim 3, further comprising a second resistive strip ohmically connected between the pair of contact pads in parallel with the first resistive strip and at a predetermined position on the substrate; the second resistive strip having a step so as to have a portion thereof lying transverse to the direction of the first resistive strip; the (c) means comprising means for moving the (b) means or the substrate relative to the other along a first predetermined line so as to effect progression of the cut of the first resistive strip; the line extending to a position adjacent and central of the transverse portion of the second resistive strip, and for then moving the (b) means or the substrate relative to the other along a second predetermined line transverse to the first, so as to effect progression of the cut of the transverse portion of the second resistive strip; the resistance of the second resistive strip being more than double the resistance of the first resistive strip.

5. An apparatus as defined in claim 4, in which the (e) means comprises means for reacting to the resistance of the second resistive strip as it increases above a predetermined value to accurately register the relative position of the (b) means, and hence a point on the second resistive strip, on the substrate, whereby coordinates on two transverse lines on the surface of the substrate are accurately registered.

6. An apparatus as defined in claim 3 further comprising a second resistive strip at right angles to the first resistive strip and adherent at a predetermined position on said surface, means for moving the cutting means in a direction transverse to the second resistive strip so as to cause the laser beam to cut through the second resistive strip after cutting through the first resistive strip, means for measuring the resistance of the second resistive strip transverse to the direction of movement of the cutting means, and means for reacting to the resistance of the second resistive strip as it increases in resistance above a predetermined value and accurately registering the position of a point on the second resistive strip, and hence of the substrate, whereby the accurate coordinates on two transverse lines on the surface of the substrate are accurately registered.

7. An apparatus as defined in claim 1, further including means for holding the substrate in a fixed position, whereby the cutting means is moved relative to the substrate.

8. A method of determining the position of elements adherent to the surface of a substrate, comprising the steps of:

a. continuously measuring the resistance between two points on a first resistive strip fixed at a predetermined position on the surface of a substrate, b. progressively cutting the first resistive strip from one edge transversely to a line of resistance between two points, c. accurately registering the position of the last cut decrement of the first resistive strip when the measured resistance increases above a predetermined value.

9. A method as defined in claim 8 including the additional steps of:

d. continuously measuring the resistance of a second resistive strip adherent at a predetermined position on the surface of the substrate transverse to the first resistive strip, e. progressively cutting the second resistive strip transversely to and intersecting the line of resistance being measured, f. accurately registering the position of the last cut decrement of the second resistive strip when the measured resistance increases above another predetermined value, whereby the position of any elements related to said strips at the surface of the substrate may be accurately determined with respect to two transverse lines.

* * * * *

UNITED STATES PATENT OFFICE
CERTIFICATE OF CORRECTION

Patent No. 3,758,745 Dated September 11, 1973.

Inventor(s) Paul S.Wilker, William B. Kiss, Graham A. Neathway

It is certified that error appears in the above-identified patent and that said Letters Patent are hereby corrected as shown below:

The title is changed from "SUBSTRATE POSITIONED DETERMINATION STRUCTURE AND METHOD" to -SUBSTRATE POSITION DETERMINATION STRUCTURE AND METHOD-.

Signed and sealed this 10th day of September 1974.

(SEAL)
Attest:

McCOY M. GIBSON, JR.
Attesting Officer

C. MARSHALL DANN
Commissioner of Patents